(12) United States Patent
Odell et al.

(10) Patent No.: US 7,759,914 B2
(45) Date of Patent: *Jul. 20, 2010

(54) METHOD AND APPARATUS FOR POWER CONVERSION AND REGULATION OF TWO OUTPUT VOLTAGES

(75) Inventors: Arthur B. Odell, Cupertino, CA (US); Tiziano Pastore, Monza (IT); Matteo Uccelli, Rivergaro (IT)

(73) Assignee: Power Integrations, Inc., San Jose, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 11/641,425

(22) Filed: Dec. 18, 2006

(65) Prior Publication Data

US 2008/0143309 A1 Jun. 19, 2008

(51) Int. Cl.
*G05F 1/585* (2006.01)
(52) U.S. Cl. .................. 323/267; 323/225; 323/266
(58) Field of Classification Search ......... 323/266–268, 323/224–226, 315; 363/63
See application file for complete search history.

(56) References Cited

U.S. PATENT DOCUMENTS

| 3,735,240 A | * | 5/1973 | Davis et al. ................ 323/280 |
| 3,886,436 A | * | 5/1975 | Wadlington ................ 323/225 |
| 4,680,688 A | | 7/1987 | Inou et al. |
| 4,740,878 A | * | 4/1988 | Carter et al. ................ 363/63 |
| 5,412,308 A | | 5/1995 | Brown |
| 5,532,577 A | | 7/1996 | Doluca |
| 5,552,695 A | | 9/1996 | Schwartz |

(Continued)

FOREIGN PATENT DOCUMENTS

DE 33 41 767 A1 5/1985

(Continued)

OTHER PUBLICATIONS

EP 07 25 4481—European Search Report and Written Opinion, dated Mar. 10, 2008.

(Continued)

*Primary Examiner*—Jeffrey L Sterrett
*Assistant Examiner*—Fred E Finch, III
(74) *Attorney, Agent, or Firm*—Blakely Sokoloff Taylor & Zafman, LLP

(57) ABSTRACT

A power supply converter is disclosed. An apparatus according to aspects of the present invention includes a power supply converter having an energy transfer element coupled between a power converter input and first and second power converter outputs. A switch is coupled between the power converter input and the energy transfer element. A control circuit is coupled to the switch to control switching of the switch to generate a first output voltage at the first power converter output and a second output voltage at the second power converter output. A sum of the first and the second output voltages is regulated in response to a first voltage reference. The second output voltage is regulated in response to a second voltage reference. A current in the energy transfer element is coupled to be increased when a voltage across the energy transfer element is a difference between an input voltage at the power converter input and the first output voltage. The current in the energy transfer element is coupled to be decreased when the voltage across the energy transfer element is the sum of the first and second output voltages.

20 Claims, 8 Drawing Sheets

U.S. PATENT DOCUMENTS

| | | | |
|---|---|---|---|
| 5,675,239 | A | 10/1997 | Kim et al. |
| 5,896,284 | A | 4/1999 | Murasato et al. |
| 6,075,295 | A | 6/2000 | Li |
| 6,222,352 | B1 | 4/2001 | Lenk |
| 6,650,095 | B2 | 11/2003 | Aiello et al. |
| 6,919,713 | B2 | 7/2005 | Hoshino et al. |
| 2002/0060875 | A1 | 5/2002 | Janz |
| 2002/0125864 | A1 | 9/2002 | Aiello et al. |
| 2005/0140350 | A1* | 6/2005 | Kitagawa et al. ............ 323/312 |
| 2007/0210764 | A1* | 9/2007 | Odell ......................... 323/222 |

FOREIGN PATENT DOCUMENTS

EP          1 830 458 A2       9/2007

OTHER PUBLICATIONS

Aiello, N. et al., "AN1514 Application Note, VIPower: Double Output Buck or Buck-Boost Converter Using VIPer12/22A", Feb. 2002, pp. 1-11.

Aiello, N. et al., "AN1374 Application Note, VIPower: Complementary Double Output Non Isolated Power Supply Based on VIPer12A", Apr. 2001, pp. 1-14.

Power Integrations, "LNK302/304-306 Link Switch®-TN Family, Lowest Component Count, Energy Efficient Off-Line Switcher IC", Mar. 2005, pp. 1-16.

Carl Nelson, "Dual Output Regulator Uses Only One Inductor," Linear Technology Design Notes, Design Note 100, Linear Technology Corporation, Mar. 1995.

EP 06 25 4828—European Search Report, dated Mar. 31, 2008.

U.S. Appl. No. 12/484,007, filed Jun. 12, 2009, Odell.

Office Action mail date Oct. 10, 2007, U.S. Appl. No. 11/365,272, filed Mar. 1, 2006. (Publication No. 2007-0210764-A1).

Office Action mail date Jun. 30, 2008, U.S. Appl. No. 11/365,272, filed Mar. 1, 2006. (Publication No. 2007-0210764-A1).

EP 09 16 5026—European Search Report and Written Opinion, dated Jan. 25, 2010, 6 pages.

* cited by examiner

METHOD AND APPARATUS FOR POWER CONVERSION AND REGULATION OF TWO OUTPUT VOLTAGES

BACKGROUND INFORMATION

1. Field of the Disclosure

The present invention relates generally to electronic circuits, and more specifically, the invention relates to circuits in which there is power regulation.

2. Background

Electrical devices need power to operate. Many electrical devices are powered using switched mode power converters. Some switched mode power converters are designed to provide multiple output voltages. One challenge with power converters of this type is to provide positive and negative DC output voltages. Known power converters of this type often rely on fixed values of Zener diodes to set the output voltages. In many such circuits, the Zener diodes conduct a substantial portion if not all the current in one of the loads. The power lost in the Zener diodes in these known circuits results in low efficiency that is unacceptable in many applications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples related to power supply regulators are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. Furthermore, the particular features, structures or characteristics may be combined for example into any suitable combinations and/or subcombinations in one or more embodiments or examples.

As will be discussed, some example power supply regulators in accordance with the teachings of the present invention utilize switched mode power conversion that provide two output voltages of opposite polarity with respect to a common reference that is the input return. Examples of the disclosed power supply regulators may be used in a variety of applications in which positive and negative direct current (DC) output voltages are provided from a higher input voltage without an isolation transformer. The example methods disclosed can provide two regulated output voltages at lower costs and higher efficiency than other known methods. More flexibility is provided by the disclosed power supply regulators and methods in the selection of output voltages than by other known methods that require high currents to flow in Zener diodes to set output voltages. Some target applications for the disclosed power supply regulator and methods are those that do not require galvanic isolation between input and output, such as power supplies for major household appliances.

Figure 1:
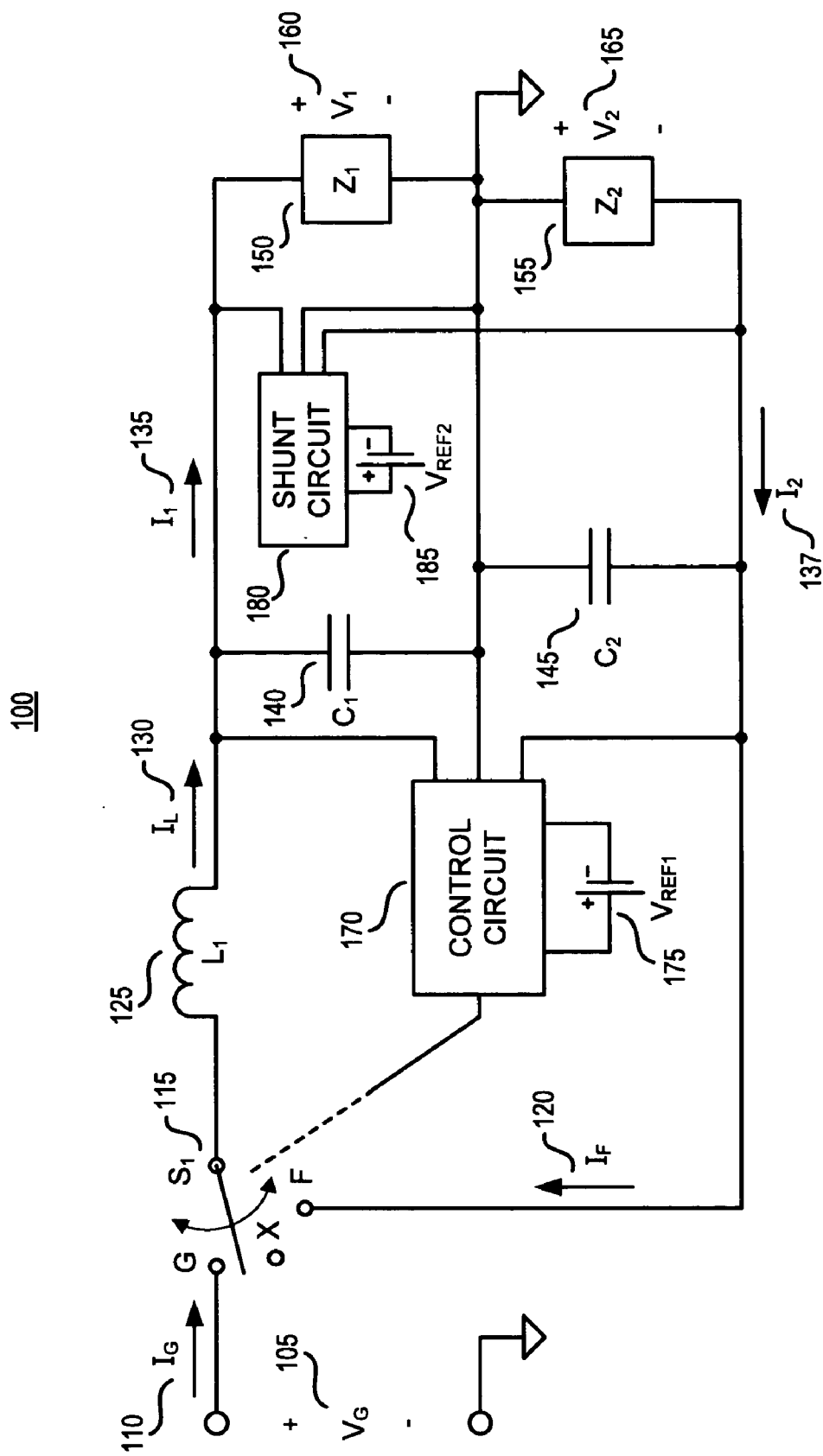
FIG. 1 is a schematic that shows generally an example functional block diagram of a power converter or switching regulator with a positive and a negative output referenced to an input return in accordance with the teachings of the present invention.

To illustrate, FIG. 1 is a functional block diagram that shows an example generalized power converter or switching regulator 100 in accordance with the teachings of the present invention with a positive and a negative output 160 and 165, respectively, referenced to the input return. As shown, a DC input voltage $V_G$ 105 is coupled to switch $S_1$ 115, which is controlled by control circuit 170. In the various examples, control circuit 170 includes circuitry to employ any of a variety of switching techniques including at least one of a constant frequency pulse width modulation (PWM), variable frequency PWM, on/off control or the like. Control circuit 170 also uses a reference voltage $V_{REF1}$ 175 for the purpose of regulating an output. An energy transfer element, which is illustrated as inductor $L_1$ 125, is coupled between switch $S_1$ 115 and the outputs of the regulator circuit 100. In the illustrated example, the outputs are shown as output voltage $V_1$ 160 across load impedance $Z_1$ 150 and output voltage $V_2$ 165 across load impedance $Z_2$ 155. Capacitor $C_1$ 140 is illustrated as being coupled across load impedance $Z_1$ 150 and capacitor $C_2$ 145 is illustrated as being coupled across load impedance $Z_2$ 155. As shown in the illustrated example of FIG. 1, the outputs are each coupled to a ground terminal coupled to both load impedance $Z_1$ 150 and load impedance $Z_2$ 155.

In operation, DC input voltage $V_G$ 105 is converted to output voltage $V_1$ 160 across load impedance $Z_1$ 150 and output voltage $V_2$ 165 across load impedance $Z_2$ 155 by the action or switching of switch $S_1$ 115 in response to a control circuit 170. For explanation purposes, switch S1 115 is illustrated in FIG. 1 as a single pole, multi-throw switch adapted to switch among three positions or settings. It is appreciated that switch S1 115 may be implemented using a variety of techniques such as for example using a circuit to provide the described switching function, or the like.

As shown in the example, switch S1 115 includes a terminal coupled to inductor 125 and can be coupled to be set in a first setting or position G to provide a conduction path for inductor 125 to receive current $I_G$ 110, or in a second setting or position F to provide a conduction path for inductor 125 to receive current $I_F$ 120, or in a third or off setting or position X, such that inductor 125 is not coupled to receive either current $I_G$ 110 or current $I_F$ 120. Thus, when switch $S_1$ 115 is in position G, the current $I_L$ 130 in inductor $L_1$ 125 is the same as the input current $I_G$ 110 supplied from the input voltage $V_G$ 105. When switch $S_1$ 115 is in position F, the current $I_L$ 130 in inductor $L_1$ 125 is the same as freewheeling current $I_F$ 120 derived from an output of the power converter as shown. When switch $S_1$ 115 is in position X, the current $I_L$ 130 in inductor $L_1$ 125 is zero.

In the illustrated example, control circuit 170 switches switch $S_1$ 115 between positions G, X, and F with sequence and durations to regulate one output according to the value of the reference voltage $V_{RF1}$ 175. In one mode of operation, (continuous conduction mode) the switch $S_1$ 115 spends no time at position X. The single regulated output may be $V_1$ 160, $V_2$ 165, or a combination of both. A shunt circuit 180 that is coupled across an output of power converter 100 uses another reference voltage $V_{REF2}$ 185. The shunt circuit 180 may increase or decrease current $I_1$ 135 or current $I_2$ 137 to regulate one additional output.

In operation, the switching of switch $S_1$ 115 produces currents $I_L$ 130, $I_G$ 110, and $I_F$ 120 that contain triangular or trapezoidal components. Capacitors C1 140 and C2 145 filter currents $I_L$ 130 and $I_F$ 120 respectively, which produce the respective DC output voltages $V_1$ 160 and $V_2$ 165 that have small alternating current (AC) variations relative to their DC values. Load impedances $Z_1$ 150 and $Z_2$ 155 with shunt circuit 180 produce currents $I_1$ 135 and $I_2$ 137 from the respective output voltages $V_1$ 160 and $V_2$ 165.

For the regulator of FIG. 1, switch $S_1$ 115 may be controlled to regulate only a single output voltage because controller 170 has only one reference voltage $V_{RF1}$ 170. Without further means of regulation, the other output voltage will change with currents $I_1$ 135 and $I_2$ 137 that are responsive to changes in load impedances $Z_1$ 160 and $Z_2$ 165. To regulate more than one output voltage requires another regulator to change current $I_1$ 135 or $I_2$ 137 in response to changes in output voltages $V_1$ 160 and $V_2$ 165. In the illustrated example, control circuit 170 is shown having three inputs including an input coupled to an end of load impedance $Z_1$ 150, an input coupled to an end of load impedance $Z_2$ 155, and an input coupled to a ground terminal.

In one example of the power converter or power supply regulator 100, control circuit 170 is not included or is instead adapted to switch $S_1$ 115 in a fixed pattern, which produces an unregulated output voltage $V_1$ 160 or $V_2$ 165. In this example, current $I_L$ 130 through inductor $L_1$ 125 increases when the voltage across inductor $L_1$ 125 is the difference between the input voltage $V_G$ 105 and output voltage $V_1$ 160, which is what occurs when switch $S_1$ 115 is in position G. Continuing with this example, the current $I_L$ 130 through inductor $L_1$ 125 decreases when the voltage across inductor $L_1$ 125 is the sum of output voltage $V_1$ 160 and output voltage $V_2$ 165, which is what occurs when switch $S_1$ 115 is in position F.

Figure 2:
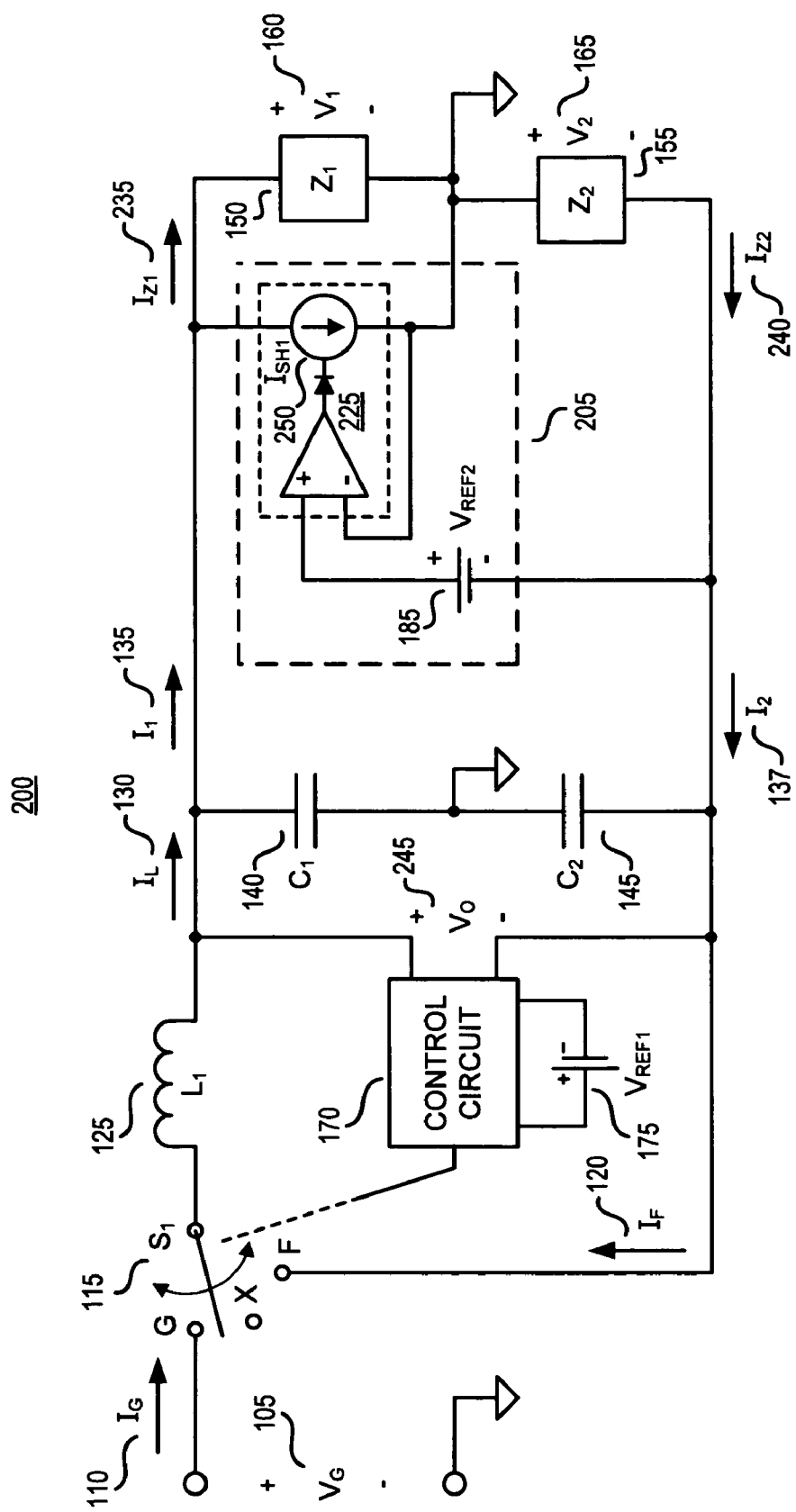
FIG. 2 is a schematic that shows generally a power converter including an example shunt regulator that regulates output voltages in accordance with the teachings of the present invention.

FIG. 2 shows generally a power converter or power supply regulator 200, which includes a shunt regulator 205 coupled to regulate an output voltage $V_2$ 165 by adding more or less current to the load current $I_{Z1}$ 235 from load impedance $Z_1$ 150 in response to the output voltage $V_2$ 165 on load impedance $Z_2$ 155. In the illustrated example, shunt regulator 205 changes current $I_1$ 135 independently in response to changes in output currents $I_{Z1}$ 235 and $I_{Z2}$ 240 to regulate the desired output voltage $V_2$ 165 in accordance with the teachings of the present invention. Output currents $I_{Z1}$ 235 and $I_{Z2}$ 240 may change in response to changes in the respective load impedances $Z_1$ and $Z_2$, or in response to a change in the input voltage $V_G$ 105. In operation, shunt regulator 205 only adds to the current in the load $Z_1$ 150 if the load impedance $Z_1$ 150 is insufficient to regulate the desired output voltage $V_2$ 165. In the example shown in FIG. 2, power supply regulator 200 includes power supply regulator 100 of FIG. 1 with the addition of shunt regulator 205 to perform the function of shunt circuit 180 with reference voltage $V_{REF2}$ 185. As shown in FIG. 2, control circuit 170 switches switch $S_1$ 115 to regulate an output voltage $V_O$ 245., which is the sum of $V_1$ 160 and $V_2$ 165.

In the illustrated example, shunt regulator 205 includes a transconductance amplifier 225 that produces unidirectional current from current source $I_{SH1}$ 250 coupled across load impedance $Z_1$ 150 to regulate voltage $V_2$ 165 across load impedance $Z_2$ 155. Since the controller 170 regulates the sum of $V_1$ 160 and $V_2$ 165, regulation of $V_2$ 165 by shunt regulator 205 also regulates $V_1$ 160. In operation, if there is a change in load to cause a decrease in current $I_{Z2}$ 240, the control circuit 170 will modify the switching of switch SI to regulate the value of output voltage $V_O$ 245 in accordance with the teachings of the present invention. Then current source $I_{SH1}$ 250 will decrease to maintain output voltages $V_1$ 160 and $V_2$ 165 at the values determined by the reference voltage $V_{REF2}$ 185. If there is a change in load impedance $Z_1$ 160 to cause a decrease in current $I_{Z1}$ 235, the current source $I_{SH1}$ 250 will increase in response to a decrease in output voltage $V_2$ 165 to regulate the output voltages $V_1$ 160 and $V_2$ 165. In various examples, shunt regulator 205 is included in an integrated circuit.

Figure 3:
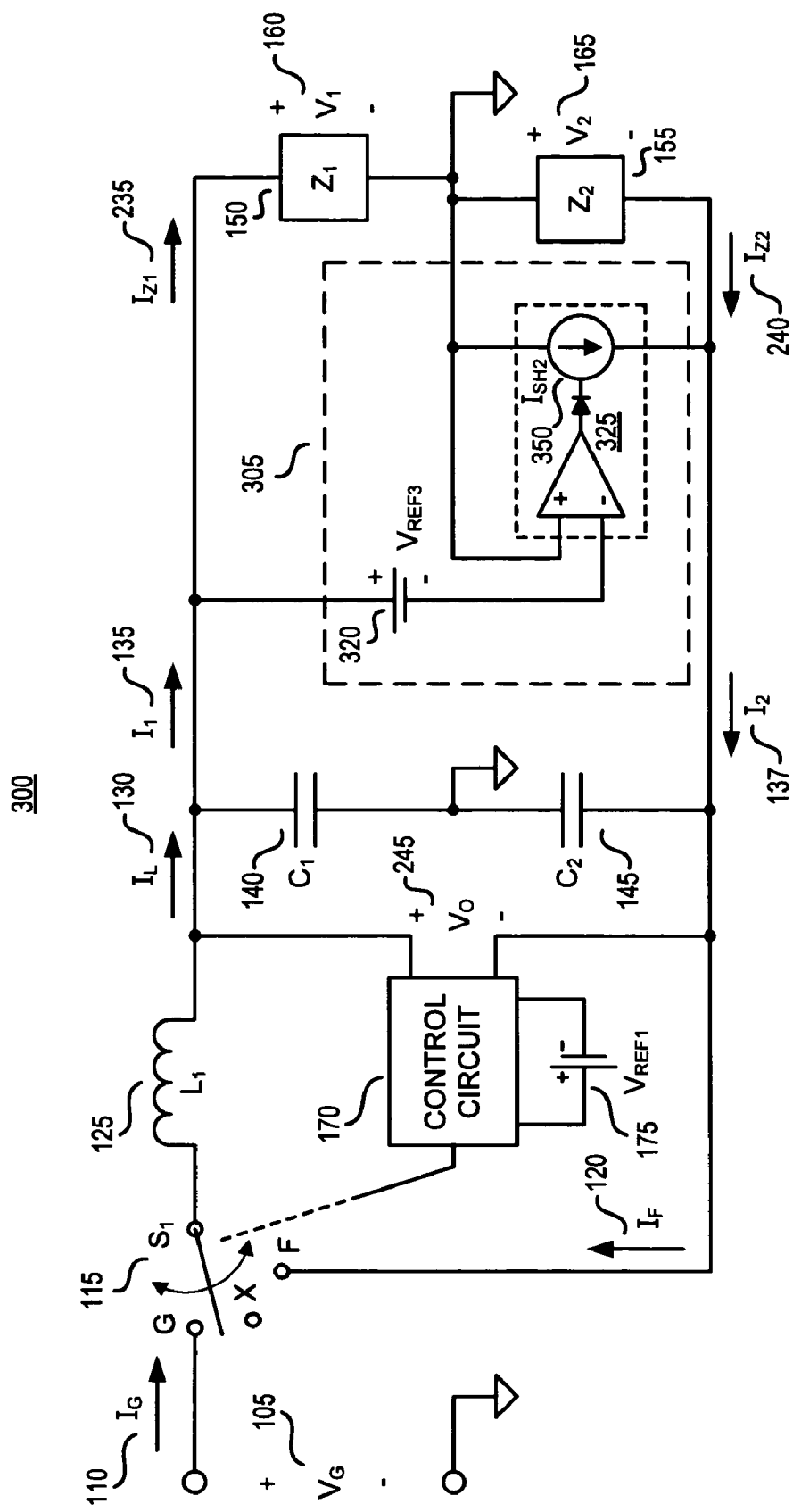
FIG. 3 is a schematic that shows generally a power converter that includes an alternative example shunt regulator that regulates output voltages in accordance with the teachings of the present invention.

FIG. 3 shows generally a power converter or power supply regulator 300, which includes a shunt regulator 305 coupled to regulate an output voltage $V_1$ 160 by adding more or less current to the load current $I_{Z2}$ 240 from load impedance $Z_2$ 150 in response to the output voltage $V_1$ 160 on load impedance $Z_1$ 150. In the illustrated example, shunt regulator 305 changes current $I_2$ 137 independently in response to changes in output currents $I_{Z1}$ 235 and $I_{Z2}$ 240 to regulate the desired output voltage $V_1$ 160 in accordance with the teachings of the present invention. Output currents $I_{Z1}$ 235 and $I_{Z2}$ 240 may change in response to changes in the respective load impedances $Z_1$ and $Z_2$, or in response to a change in the input voltage $V_G$ 105. In operation, shunt regulator 305 only adds to the current in the load $Z_2$ 155 if the load impedance $Z_2$ 150 is insufficient to regulate the desired output voltage $V_1$ 160. In the example shown in FIG. 3, power supply 300 includes power supply regulator 100 of FIG. 1 with the addition of shunt regulator 305 with voltage reference $V_{REF3}$ 320 to perform the function of shunt circuit 180 with reference voltage $V_{REF2}$ 185. As shown in FIG. 3, control circuit 170 switches switch $S_1$ 115 to regulate an output voltage $V_O$ 245, which is the sum of $V_1$ 160 and $V_2$ 165.

In the illustrated example, transconductance amplifier 325 included in shunt regulator 305 produces unidirectional current from current source $I_{SH2}$ 350 coupled across load impedance $Z_2$ 155 to regulate voltage $V_1$ 160 across load impedance $Z_1$ 150. Since the controller 170 regulates the sum of $V_1$ 160 and $V_2$ 165, regulation of $V_1$ 160 by shunt regulator 305 also regulates $V_2$ 165. In operation, if there is a change in load to cause a decrease in current $I_{Z1}$ 235, the control circuit 170 will modify the switching of switch $S_1$ to regulate the value of output voltage $V_O$ 245 in accordance with the teachings of the present invention. Then current source $I_{SH2}$ 350 will decrease to maintain output voltages $V_1$ 160 and $V_2$ 165 at the values determined by the reference voltage $V_{REF3}$ 320. If there is a change in load impedance $Z_2$ 165 to cause a decrease in current $I_{Z2}$ 240, the current source $I_{SH2}$ 350 will increase in response to a decrease in output voltage $V_1$ 160 to regulate the output voltages $V_1$ 160 and $V_2$ 165. In various examples, shunt regulator 305 is included in an integrated circuit.

It is preferable that the shunt regulator 205 or 305 should regulate the output voltage that requires the tighter regulation. Thus, the example of FIG. 2 is preferable when the voltage $V_2$ 165 requires tighter regulation than the voltage $V_1$ 160, and the example of FIG. 3 is preferable when the voltage $V_1$ 160 requires tighter regulation than the voltage $V_2$ 165.

Figure 4:
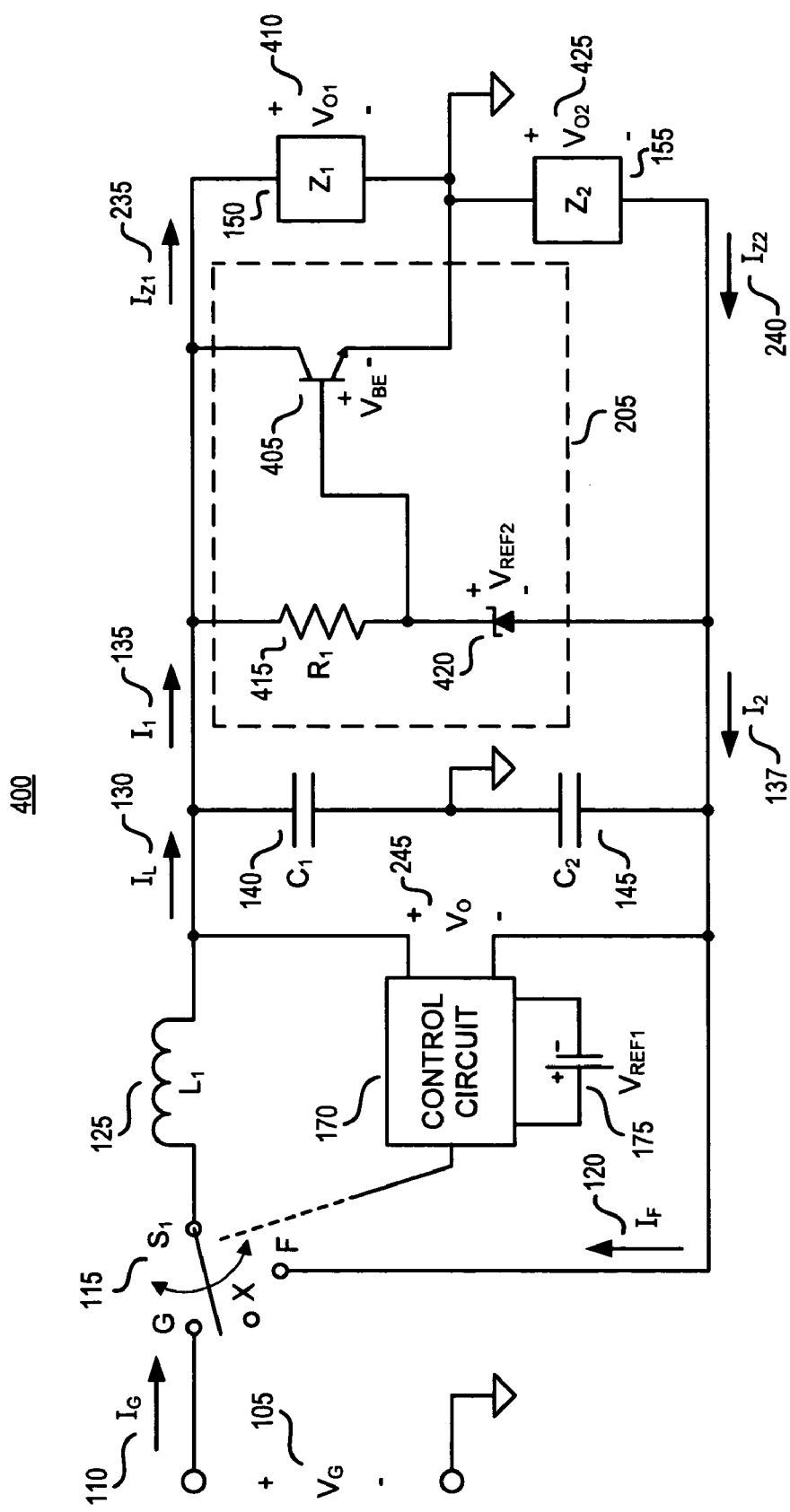
FIG. 4 is a schematic that shows generally a power converter that includes an example shunt regulator circuit that regulates a desired output voltage in accordance with the teachings of the present invention.

FIG. 4 shows generally a power converter or power supply regulator 400, with one example of shunt regulator 205 that uses a resistor $R_1$ 415, a Zener diode 420, and an NPN transistor 405. Zener diode 420 sets a reference voltage $V_{REF2}$ at the base of the NPN transistor 405. Resistor R1 415 provides current to the Zener diode 420 and to the base of the NPN transistor 405. In the example of FIG. 4, the voltage $V_{O2}$ 425 is regulated to be the voltage $V_{REF2}$ reduced by the base to emitter voltage $V_{BE}$ of NPN transistor 405. Since the base to emitter voltage changes with temperature, output voltages $V_{O1}$ 410 and $V_{O2}$ 425 will also change with temperature.

Figure 5:
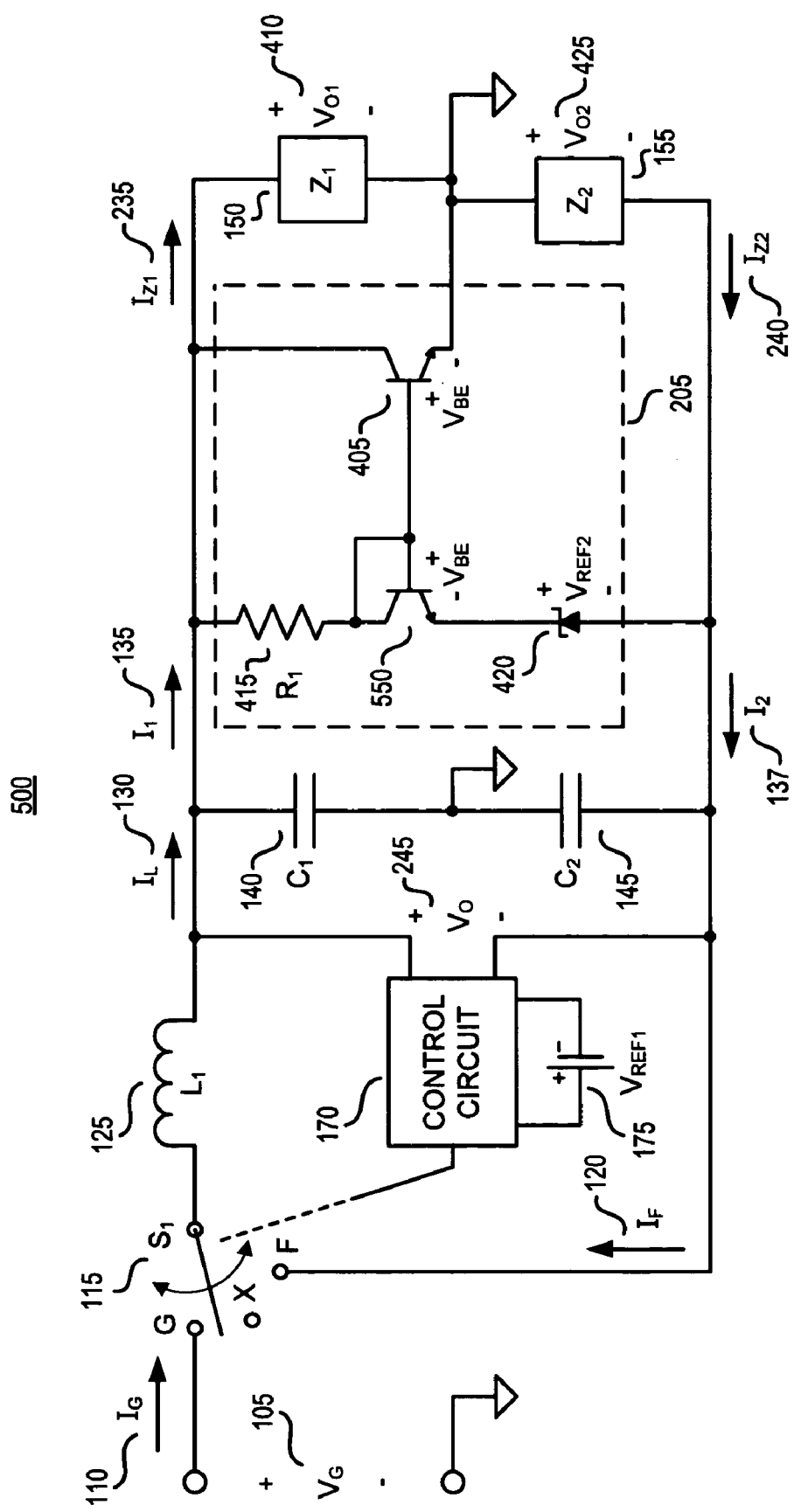
FIG. 5 is a schematic that shows generally a power converter that includes an example temperature compensated shunt regulator circuit that regulates a desired output voltage in accordance with the teachings of the present invention.

FIG. 5 shows generally a power converter or power supply regulator 500, with another example of shunt regulator 205 that adds an NPN transistor 550 to the example circuit of FIG. 4. In the example of FIG. 5, the base to emitter voltage of transistor 550 is substantially equal to the base to emitter voltage of transistor 405 at all temperatures. Therefore, the output voltage $V_{O2}$ 425 in the example of FIG. 5 is regulated to be the voltage $V_{REF2}$ from Zener diode 420, substantially invariant to changes in temperature. It is preferable for the NPN transistors 405 and 550 to be identical for the best temperature compensation.

Figure 6:
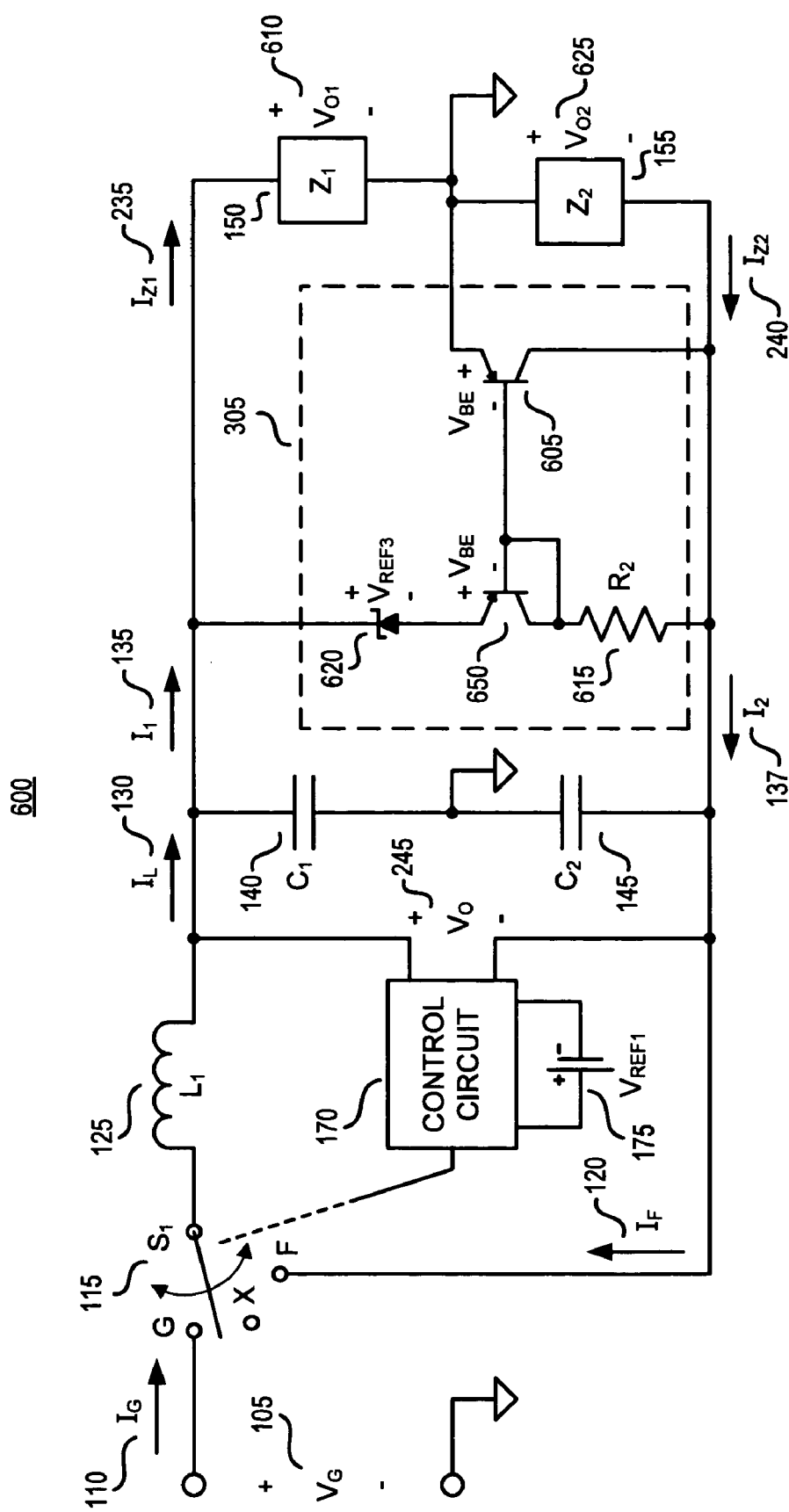
FIG. 6 is a schematic that shows generally a power converter that includes an alternative example temperature compensated shunt regulator circuit that regulates a desired output voltage in accordance with the teachings of the present invention.

FIG. 6 shows generally a power converter or power supply regulator 600 that combines the example of the shunt regulator 305 of FIG. 3 with the temperature compensating technique of FIG. 5. In FIG. 6, Zener diode 620 establishes the reference voltage $V_{REF3}$ with current through a resistor $R_2$ 615 and PNP transistor 650. Another PNP transistor 605 performs the function of current source $I_{SH2}$ 350 of FIG. 3. It is preferable for the PNP transistors 605 and 650 to be identical for the best temperature compensation.

In the examples illustrated in FIG. 4, FIG. 5, and FIG. 6, it is appreciated that bipolar transistors 405, 550, 605, and 650 are illustrated as including single transistors. However, it is appreciated that the teachings of the present invention are not limited to single transistors and that additional transistors or other circuit elements may be added to bipolar transistors 405, 550, 605, and 650 as appropriate such as for example Darlington transistor pairs or the like to realize the desired circuit performance in accordance with the teachings of the present invention.

Figure 7:
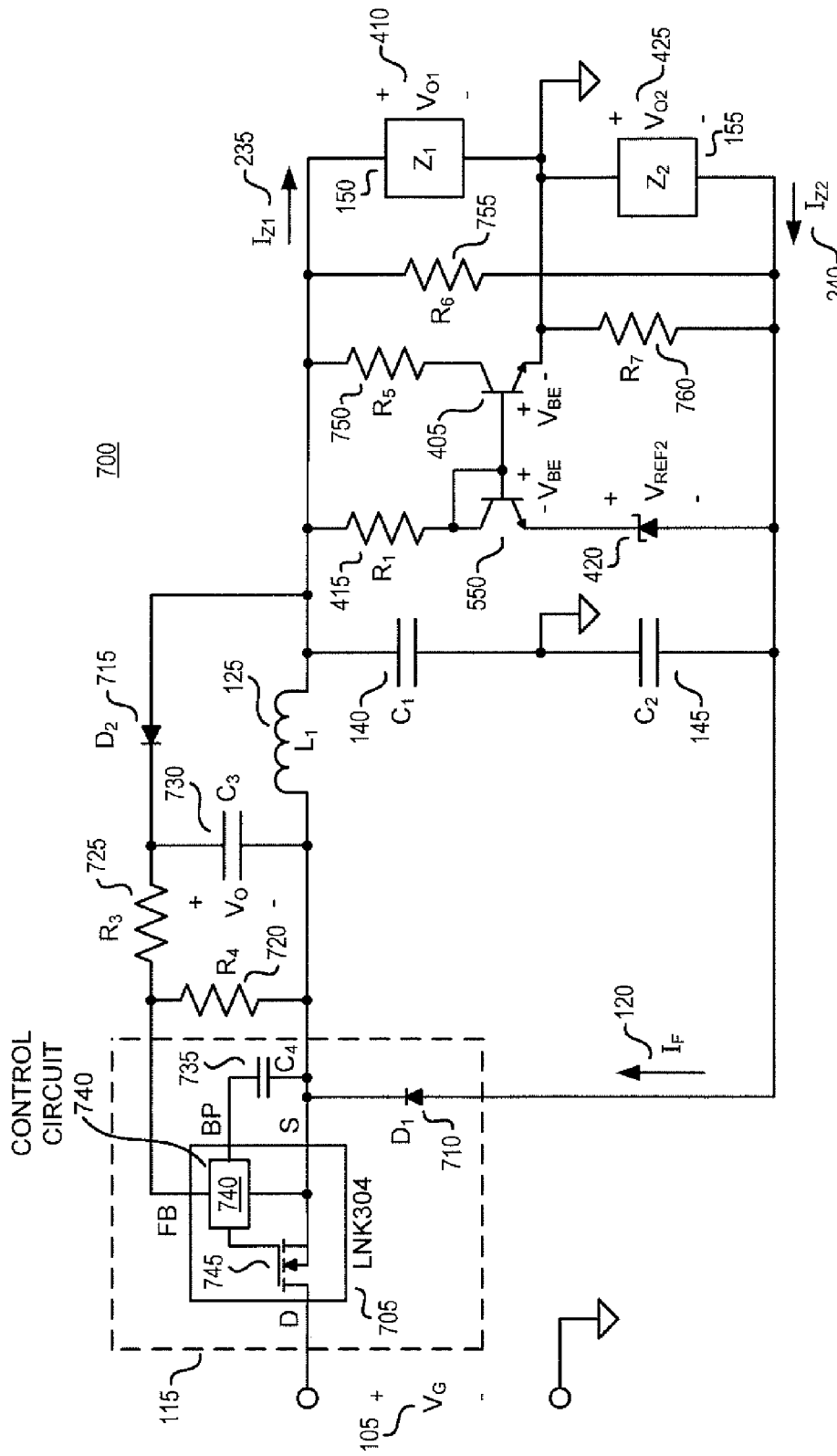
FIG. 7 is a schematic that shows generally an example power converter in greater detail in accordance with the teachings of the present invention.

FIG. 7 is one example schematic showing generally the power converter or regulator circuit of FIG. 5 with increased detail and optional components. In particular, the example of FIG. 7 shows switch $S_1$ 115 including a diode $D_1$ 710 and a transistor 745. Transistor 745 is included in an integrated circuit 705 with a control circuit 740 and a reference voltage $V_{REF1}$ that is not shown to avoid obscuring the illustration with unnecessary detail. In the illustrated example, integrated circuit 705 may be a LNK304 produced by Power Integrations, Inc. of San Jose, Calif. In the illustrated example, integrated circuit 705 is coupled between the DC input voltage $V_G$ 105 and the inductor $L_1$ 125. In another example, integrated circuit 705 is not included and transistor 745 is therefore a discrete metal oxide semiconductor (MOSFET) or bipolar transistor and control circuit 740 is a separate controller in accordance with the teachings of the present invention. Capacitor $C_4$ 735 is a bypass capacitor coupled to the BP terminal of integrated circuit 705 for the operation of integrated circuit 705. In the illustrated example, control circuit 740 receives a signal proportional to the output voltage $V_O$ that is on capacitor $C_3$ 730. Capacitor $C_3$ charges to approximately the sum of output voltages $V_{O1}$ 410 and $V_{O2}$ 425 when diode $D_1$ 710 in switch 115 conducts the freewheeling current $I_F$ 120. In operation, diode $D_1$ 710 automatically configures the switch $S_1$ 115 to position F when the diode $D_1$ 710 is conducting and to position G or X when the diode $D_1$ 710 is not conducting. Optional resistor $R_5$ 750 reduces the power dissipation in NPN transistor 405, and also limits the current in NPN transistor 405. Resistors $R_6$ 755 and $R_7$ 760 provide minimum loading to the outputs should the load impedances $Z_1$ 150 and $Z_2$ 155 be removed.

Figure 8:
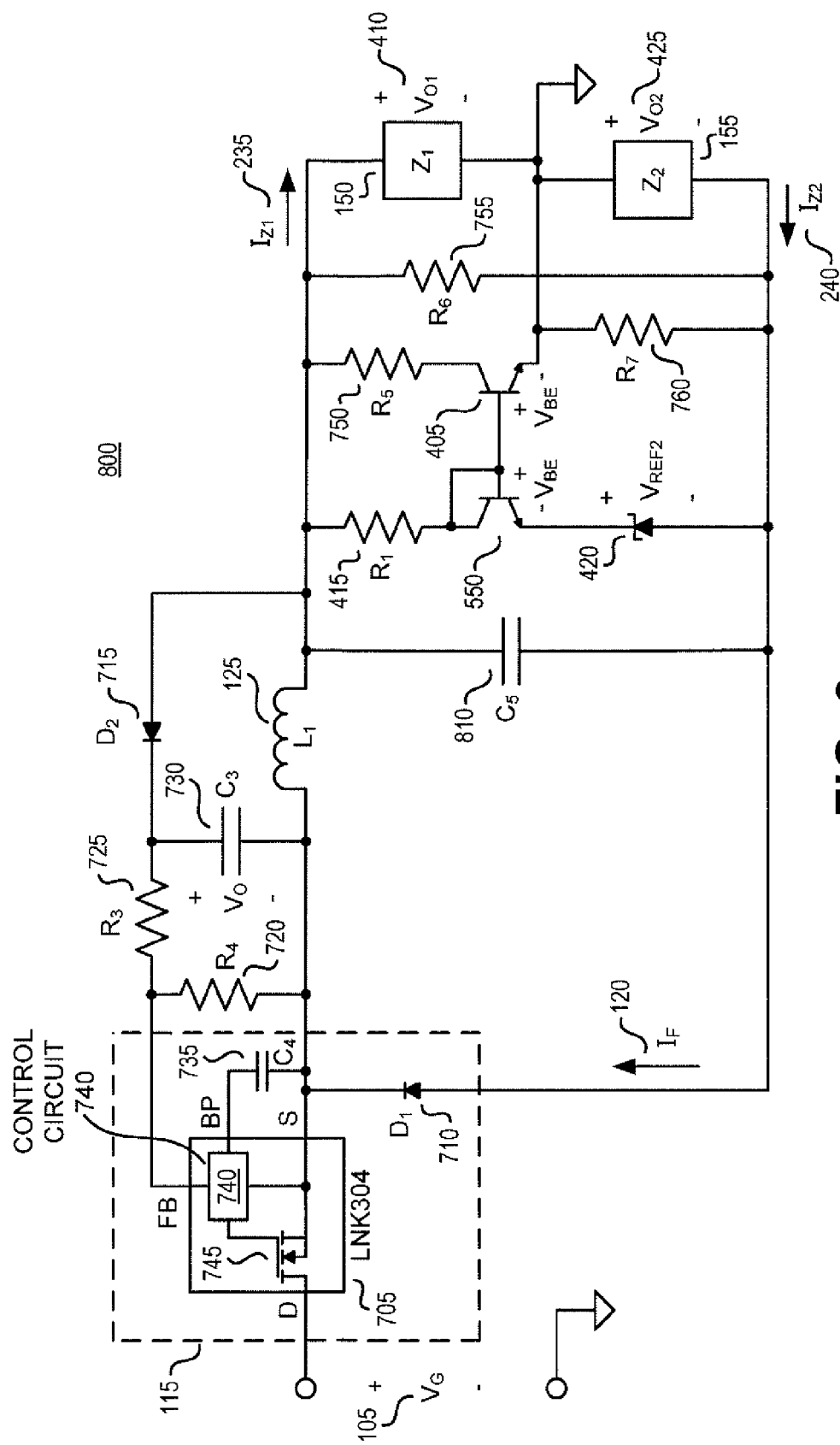
FIG. 8 is a schematic that shows generally an alternative example power converter circuit in accordance with the teachings of the present invention.

FIG. 8 is another example schematic showing generally the power converter or regulator circuit of FIG. 7 with a single capacitor $C_5$ 810 coupled across the outputs replacing the previously described two capacitors $C_1$ 140 and $C_2$ 145 to reduce the cost of the power supply.

In the foregoing detailed description, the method and apparatus of the present invention have been described with reference to specific examples or embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power converter, comprising:
   an energy transfer element coupled between a power converter input and first and second power converter outputs;
   a switch having a first terminal coupled to the energy transfer element to provide a conduction path for the energy transfer element to receive an input current supplied from the power converter input;
   a control circuit coupled to the switch to control switching of the switch to generate a first output voltage at the first power converter output and a second output voltage at the second power converter output, wherein a sum of the first and the second output voltages is regulated in response to a first voltage reference, wherein the second output voltage is regulated in response to a second voltage reference, wherein a current in the energy transfer element is coupled to be increased when a voltage across the energy transfer element is a difference between an input voltage at the power converter input and the first output voltage, and wherein the current in the energy transfer element is coupled to be decreased when the voltage across the energy transfer element is the sum of the first and second output voltages;
   a capacitor having a second terminal and a third terminal, wherein the second terminal is coupled to the first terminal of the switch and the third terminal is coupled between the first power converter output and a feedback terminal of the control circuit, wherein the capacitor is coupled to charge to a voltage approximately equal to the sum of the first and second output voltages, wherein the control circuit is further coupled to regulate the sum of the first and second output voltages in response to a signal proportional to the voltage on the capacitor; and a shunt circuit coupled across the first power converter output to regulate the second output voltage in response to the second voltage reference.

2. The power converter of claim 1 further comprising a Zener diode coupled to the shunt circuit to provide the second voltage reference.

3. The power converter of claim 2 wherein the shunt circuit comprises a unidirectional transconductance amplifier coupled to the first power converter output to add unidirectional current at the first power converter output if a first load impedance is insufficient to regulate the first output voltage.

4. The power converter of claim 3 wherein the unidirectional transconductance amplifier is coupled to the second voltage reference.

5. The power converter of claim 2 wherein the shunt circuit includes a first bipolar transistor coupled in series with a first resistor coupled across the first power converter output.

6. The power converter of claim 5 wherein the shunt circuit further includes a thermal matching bipolar transistor coupled to cancel variance of a voltage drop based on temperature on the first bipolar transistor.

7. The power converter of claim 1 wherein the energy transfer element comprises an inductor.

8. The power converter of claim 1, wherein the capacitor is a first capacitor, the power converter further comprising a second capacitor coupled across the first power converter output and a third capacitor coupled across the second power converter output.

9. The power converter of claim 1, wherein the capacitor is a first capacitor, the power converter further comprising a second capacitor coupled across the first and second power converter outputs.

10. The power converter of claim 1 wherein the first and second power converter outputs are coupled to a common ground terminal.

11. The power converter of claim 1, wherein the conduction path is a first conduction path, wherein the switch is coupled to provide the first conduction path when the current in the energy transfer element is coupled to increase when the voltage across the energy transfer element is a difference between an input voltage at the power converter input and the first output voltage, and wherein the switch is coupled to provide a second conduction path when the current in the energy transfer element is coupled to decrease when the voltage across the energy transfer element is the sum of the first and second output voltages.

12. The power converter of claim 1 wherein the control circuit further includes circuitry to employ at least one of constant frequency pulse width modulation (PWM), variable frequency PWM, or on/off control.

13. The power converter of claim 1 wherein the switch is coupled to be set in one of three settings, wherein when the switch is in a first setting, a current in the energy transfer element is the same as the input current supplied from the power converter input, wherein when the switch is in a second setting, the current in the energy transfer element is the same as a freewheeling current from the second power converter output, and wherein when the switch is in a third setting, the current in the energy transfer element is zero.

14. The power converter of claim 1, further comprising a diode coupled between the second output and the switch, wherein the capacitor is coupled to charge to the voltage approximately equal to the sum of the first and second output voltages when the diode is conducting a freewheeling current.

15. The power converter of claim 14, wherein the diode is a first diode having a cathode coupled to the second terminal of the capacitor and an anode coupled to the second output, the power converter further comprising a second diode having a cathode coupled to the third terminal of the capacitor and an anode coupled to the first output.

16. The power converter of claim 1, wherein the shunt circuit comprises:
a first transistor coupled across the first output; and
a second transistor having a base terminal coupled to a base terminal of the first transistor and an emitter terminal coupled to receive the second voltage reference, wherein a base to emitter voltage of the first transistor is substantially equal to a base to emitter voltage of the second transistor for temperature compensation.

17. A power converter, comprising:
an energy transfer element coupled between a power converter input and first and second power converter outputs;
a switch having a first terminal coupled to the energy transfer element to provide a conduction path for the energy transfer element to receive an input current supplied from the power converter input;
a control circuit coupled to the switch to control switching of the switch to generate a first output voltage at the first power converter output and a second output voltage at the second power converter output, wherein the first output voltage is regulated in response to a voltage reference, wherein a current in the energy transfer element is coupled to increase when a voltage across the energy transfer element is a difference between an input voltage at the power converter input and the first output voltage, wherein the current in the energy transfer element is coupled to decrease when the voltage across the energy transfer element is a sum of the first and second output voltages;
a capacitor having a second terminal and a third terminal, wherein the second terminal is coupled to the first terminal of the switch and the third terminal is coupled between the first power converter output and a feedback terminal of the control circuit, wherein the capacitor is coupled to charge to a voltage approximately equal to the sum of the first and second output voltages, wherein the control circuit is further coupled to regulate the sum of the first and second output voltages in response to a signal proportional to the voltage on the capacitor; and
a shunt circuit coupled across the second power converter output to regulate the first output voltage at the first power converter output in response to the voltage reference.

18. The power converter of claim 17, further comprising a diode coupled between the second output and the switch, wherein the capacitor is coupled to charge to the voltage approximately equal to the sum of the first and second output voltages when the diode is conducting a freewheeling current.

19. The power converter of claim 18, wherein the diode is a first diode having a cathode coupled to the second terminal of the capacitor and an anode coupled to the second output, the power converter further comprising a second diode having a cathode coupled to the third terminal of the capacitor and an anode coupled to the first output.

20. The power converter of claim 17, wherein the shunt circuit comprises:
a first transistor coupled across the first output; and
a second transistor having a base terminal coupled to a base terminal of the first transistor and an emitter terminal coupled to receive the second voltage reference, wherein a base to emitter voltage of the first transistor is substantially equal to a base to emitter voltage of the second transistor for temperature compensation.

* * * * *